(12) United States Patent
Li et al.

(10) Patent No.: US 10,826,305 B2
(45) Date of Patent: Nov. 3, 2020

(54) FAST CHARGING METHOD AND RELATED DEVICE FOR PARALLEL BATTERY PACK

(71) Applicant: HUAWEI TECHNOLOGIES CO., LTD., Shenzhen, Guangdong (CN)

(72) Inventors: Yingtao Li, Shenzhen (CN); Kui Zhou, Dongguan (CN); Qiang Wang, Shenzhen (CN); Guanghui Zhang, Dongguan (CN); Pinghua Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/351,517

(22) Filed: Mar. 13, 2019

(65) Prior Publication Data
US 2019/0214832 A1 Jul. 11, 2019

Related U.S. Application Data

(63) Continuation of application No. PCT/CN2017/089647, filed on Jun. 22, 2017.

(30) Foreign Application Priority Data

Sep. 14, 2016 (CN) .......................... 2016 1 0826872

(51) Int. Cl.
*H02J 7/00* (2006.01)
*H02J 7/02* (2016.01)

(52) U.S. Cl.
CPC .......... *H02J 7/0024* (2013.01); *H02J 7/0026* (2013.01); *H02J 7/022* (2013.01); *H02J 7/00304* (2020.01)

(58) Field of Classification Search
CPC ........ H02J 7/0024; H02J 7/0026; H02J 7/022; H02J 7/00304
(Continued)

(56) References Cited

U.S. PATENT DOCUMENTS

2009/0286149 A1 11/2009 Ci et al.
2010/0261043 A1* 10/2010 Kim .................. H01M 10/4207
429/61
(Continued)

FOREIGN PATENT DOCUMENTS

CN 2155042 Y 2/1994
CN 101262140 A 9/2008
(Continued)

*Primary Examiner* — Richard V Muralidar
(74) *Attorney, Agent, or Firm* — Womble Bond Dickinson (US) LLP

(57) ABSTRACT

A fast charging method for a parallel battery pack is provided, including: obtaining a maximum charging current allowed by a charging trunk and a charging current required for charging a parallel battery pack; comparing the charging current required for charging the parallel battery pack with the maximum charging current allowed by the charging trunk; if the charging current required for charging the parallel battery pack is less than or equal to the maximum charging current allowed by the charging trunk, performing parallel charging on battery units; or if the charging current required for charging the parallel battery pack is greater than the maximum charging current allowed by the charging trunk, changing some or all of battery units in the parallel battery pack to a series connection, and performing series charging on the battery units. The fast charging method for a parallel battery pack can effectively shorten a charging time.

12 Claims, 9 Drawing Sheets

(58) Field of Classification Search
USPC .......................................................... 320/117
See application file for complete search history.

(56) References Cited

U.S. PATENT DOCUMENTS

| | | | | |
|---|---|---|---|---|
| 2011/0001456 A1* | 1/2011 | Wang | ................... | H02J 7/0016 |
| | | | | 320/117 |
| 2014/0015488 A1* | 1/2014 | Despesse | ............ | H01M 10/425 |
| | | | | 320/122 |
| 2015/0288199 A1 | 10/2015 | Bui-Van et al. | | |
| 2016/0126766 A1* | 5/2016 | Zhang | .................. | G01R 31/387 |
| | | | | 320/116 |
| 2019/0214833 A1* | 7/2019 | Li | ........................ | G01R 31/382 |

FOREIGN PATENT DOCUMENTS

| | | |
|---|---|---|
| CN | 101277022 A | 10/2008 |
| CN | 101777675 A | 7/2010 |
| CN | 103904766 A | 7/2014 |
| CN | 203747439 U | 7/2014 |
| CN | 104221244 A | 12/2014 |
| CN | 106374560 A | 2/2017 |
| EP | 1947752 A1 | 7/2008 |
| JP | 2015173569 A | 10/2015 |

* cited by examiner

FAST CHARGING METHOD AND RELATED DEVICE FOR PARALLEL BATTERY PACK

CROSS-REFERENCE TO RELATED APPLICATIONS

This application is a continuation of International Application No. PCT/CN2017/089647, filed on Jun. 22, 2017, which claims priority to Chinese Patent Application No. 201610826872.2, filed on Sep. 14, 2016, which are hereby incorporated by reference in their entireties.

TECHNICAL FIELD

Embodiments of the present invention relate to the field of fast charging technologies for batteries, and in particular, to a fast charging method and related device for a parallel battery pack.

BACKGROUND

Power lithium-ion batteries have such advantages as a high nominal voltage, high specific energy, high charging and discharging efficiency, and a long service life, and are currently widely used in the fields of electric cars, battery energy storage, and the like. In use of lithium-ion batteries, cells are connected in series to achieve a specific voltage level, and batteries also need to be connected in parallel to achieve a specific capacity level, so as to meet voltage and power requirements. A battery pack is usually composed of tens to hundreds of cells connected in series or connected first in parallel and then in series. For a parallel battery pack, a maximum charging current required by the parallel battery pack is a sum of maximum charging currents of all cells connected in parallel, and therefore a charging time can be effectively shortened. However, during parallel charging, an excessive charging current required may exceed a maximum allowed charging current that a charging trunk can provide, and consequently batteries in the parallel battery pack cannot achieve a maximum charging rate, and a charging time is prolonged.

SUMMARY

Embodiments of the present invention provide a fast charging method, system, and apparatus for a parallel battery pack, to resolve a problem that a charging time is prolonged because a charging current required for charging a parallel battery pack is greater than a maximum charging current allowed by a charging trunk, thereby improving a charging speed and charging efficiency of the parallel battery pack.

A first aspect of the embodiments of the present invention provides a fast charging method for a parallel battery pack, including:

obtaining a maximum charging current allowed by a charging trunk and a charging current required for charging a parallel battery pack;

comparing the charging current required for charging the parallel battery pack with the maximum charging current allowed by the charging trunk;

if the charging current required for charging the parallel battery pack is less than or equal to the maximum charging current allowed by the charging trunk, performing parallel charging on the battery units; or if the charging current required for charging the parallel battery pack is greater than the maximum charging current allowed by the charging trunk, changing some or all of battery units in the parallel battery pack to a series connection, and performing series charging on the battery units.

In a scenario in which when the parallel battery pack is charged, the charging current required for charging the parallel battery pack is limited by the maximum charging current allowed by the charging trunk, the parallel battery pack is changed from parallel charging to series charging, so as to reduce the charging current required for charging the battery pack. This ensures that all battery units can obtain a maximum charging current rate during the charging, and avoids a problem of an excessively high charging current required for charging the parallel battery pack and an insufficient charging current input by an external power source, thereby shortening a charging time of the entire battery pack.

In one embodiment, before the changing all of battery units in the parallel battery pack to a series connection, the method further includes:

obtaining charge parameters of the battery units in the parallel battery pack;

determining, based on the charge parameters, whether there is a differentiated battery unit in the parallel battery pack; and if there is a differentiated battery unit in the parallel battery pack, changing some of the battery units in the parallel battery pack to a series connection.

In one embodiment, the determining, based on the charge parameters, whether there is a differentiated battery unit in the parallel battery pack includes:

obtaining a charge parameter characteristic curve of each battery unit in the parallel battery pack, where the charge parameter characteristic curve is used to define a characteristic how a charge parameter of the battery unit changes with a charge cycle quantity of the battery unit;

obtaining a charge cycle quantity of each battery unit in the parallel battery pack, and determining, based on the charge parameter characteristic curve, a charge parameter characteristic value of each battery unit at a corresponding charge cycle quantity; and comparing the charge parameter of each battery unit with the charge parameter characteristic value of the corresponding battery unit, and if there is a battery unit whose charge parameter is less than a charge parameter characteristic value by more than a preset threshold, determining that there is a differentiated battery unit in the parallel battery pack.

The charge parameter characteristic curve is determined by factors such as a selected material and a battery structure of the battery unit, and generally, batteries of a same model have a same charge parameter characteristic curve. Therefore, comparing the charge parameter of each battery unit with the charge parameter characteristic value at the corresponding charge cycle quantity can accurately determine whether the corresponding battery unit is a differentiated battery unit.

In one embodiment, the changing some of the battery units in the parallel battery pack to a series connection includes:

changing the battery units in the parallel battery pack to a series-parallel connection.

When the charging current required for charging the parallel battery pack is greater than the maximum charging current allowed by the charging trunk, and there is a differentiated battery unit in the parallel battery pack, the battery units in the parallel battery pack are changed to a series-parallel connection, so as to reduce the charging current required for charging the battery pack, thereby reducing impact of a limitation of the differentiated battery unit on the charging current, and improving a charging speed of the entire battery pack.

In one embodiment, the changing the battery units in the parallel battery pack to a series-parallel connection includes:

calculating, based on the maximum charging current allowed by the charging trunk and a maximum charging current allowed by each of the battery units, a maximum quantity of battery units allowed to be connected in parallel; and changing the battery units in the parallel battery pack to a series-parallel connection based on the maximum quantity of battery units allowed to be connected in parallel.

The maximum quantity of battery units allowed to be connected in parallel by the charging trunk is calculated based on the maximum charging current allowed by the charging trunk and the maximum charging currents of the battery units, so as to make full use of a charging capacity of the charging trunk to ensure that a highest current is input to the battery pack when series-parallel charging is performed, thereby obtaining a highest series-parallel charging speed.

In one embodiment, after the performing series charging on the battery units, the method further includes:

monitoring charging statuses of the battery units;

if detecting that charging of the differentiated battery unit is completed, making a charging loop bypass the differentiated battery unit by using a bypass switching transistor, in a switch array module, connected to the differentiated battery unit; and re-determining a maximum charging current based on a quantity of the remaining battery units, and performing charging on the remaining battery units by using the re-determined maximum charging current.

When detecting that charging of the differentiated battery unit is completed, the charging loop is made to bypass the differentiated battery unit. Because the differentiated battery unit limiting the charging current is bypassed, the remaining battery units can all be charged by using a normal maximum charging current. Therefore, the maximum charging current can be re-determined based on the quantity of the remaining battery units. This helps shorten a charging time of the entire battery pack.

In one embodiment, the changing some or all of battery units in the parallel battery pack to a series connection, and performing series charging on the battery units includes:

changing the battery units in the parallel battery pack to an all-series connection by controlling switching transistors in a switch array module to be on or off, and performing all-series charging on the battery units; or changing the battery units in the parallel battery pack to a series-parallel connection by controlling switching transistors in a switch array module to be on or off, and performing series-parallel charging on the battery units.

When all-series charging is performed, a minimum charging current can be reached, and requirements for an external input charging current and an internal charging circuit current are minimum. However, all-series charging has a relatively high requirement for consistency between battery units. When there is a differentiated battery unit among battery units connected in series, an all-series charging speed is affected. When series-parallel charging is performed, because of existence of a parallel connection, a charging current of the charging trunk may increase accordingly with a decrease of battery units connected in series or an increase of battery units connected in parallel. This imposes a lower requirement for consistency between battery units or batteries connected in series in comparison with all-series charging.

In one embodiment, after the performing series charging on the battery units, the method further includes:

monitoring charging statuses of the battery units;

if detecting that charging of the battery units is completed, ending charging of the battery units; and changing the battery units back to a parallel connection; or changing the battery units to a series connection or a series-parallel connection based on a load power requirement.

A second aspect of the embodiments of the present invention provides a fast charging system for a parallel battery pack, including an alternating current to direct current (AC/DC) conversion module, a charging control module, a switch array module, and a parallel battery pack module, where the AC/DC conversion module is connected to the charging control module, and is configured to convert, to a DC signal, an AC signal provided by an external power supply;

the charging control module is connected to the parallel battery pack module by using the switch array module, the parallel battery pack module includes a plurality of battery units connected in parallel, and the charging control module is configured to: obtain a maximum charging current allowed by a charging trunk and a charging current required for charging the parallel battery pack; and when the charging current required for charging the parallel battery pack is greater than the maximum charging current allowed by the charging trunk, control the switch array module to change some or all of battery units in the parallel battery pack module to a series connection, and perform series charging on the battery units by using the DC signal that is output by the AC/DC conversion module.

In a scenario in which the charging current required for charging the parallel battery pack is limited by the maximum charging current allowed by the charging trunk, the parallel battery pack is changed from parallel charging to series charging, so as to reduce the charging current required for charging the battery pack. This ensures that all battery units can obtain a maximum charging current rate during the charging, and avoids a problem of an excessively high charging current required for charging the parallel battery pack and an insufficient charging current input by an external power source, thereby shortening a charging time of the entire battery pack.

In one embodiment, the charging control module is further configured to: obtain charge parameters of the battery units in the parallel battery pack, and determine, based on the charge parameters, whether there is a differentiated battery unit in the parallel battery pack; and when there is a differentiated battery unit in the parallel battery pack, control the switch array module to change the battery units in the parallel battery pack module to a series-parallel connection, and perform series-parallel charging on the battery units by using the direct current signal that is output by the AC/DC conversion module.

When the charging current required for charging the parallel battery pack is greater than the maximum charging current allowed by the charging trunk, and there is a differentiated battery unit in the parallel battery pack, the battery units in the parallel battery pack are changed to a series-parallel connection, so as to reduce the charging current required for charging the battery pack, thereby reducing impact of a limitation of the differentiated battery unit on the charging current, and improving a charging speed of the entire battery pack.

In one embodiment, the switch array module includes a plurality of switching transistors and a plurality of bypass switches, each of the switching transistors is connected to at least one of the battery units, and each of the bypass switches is connected to at least one of the battery units; and the switch array module is configured to: control, by changing an on or off state of the plurality of switching transistors, the battery units to change between a series connection, a parallel connection, and a series-parallel connection; and implement charging protection or discharging protection on the battery units by changing an on or off state of the plurality of bypass switches.

In one embodiment, the charging control module includes a charging power adjustment circuit and a charging monitoring circuit; the charging power adjustment circuit is configured to obtain a charging power requirement of the battery units that have been changed to the series connection or the series-parallel connection, and adjust a charging power based on the charging power requirement; and the charging monitoring circuit is configured to monitor charging status parameters of the battery units, and implement charging protection on the battery units based on the charging status parameters by controlling the bypass switches in the switch array module to be on or off.

In one embodiment, the fast charging system further includes a discharging control module; and the discharging control module is connected to the parallel battery pack module by using the switch array module, and is configured to obtain a load power requirement, and adjust a discharging power of the parallel battery pack module based on the load power requirement by controlling the switch array module.

In one embodiment, the discharging control module includes a discharging power adjustment circuit and a discharging monitoring circuit; the discharging power adjustment circuit is configured to control, based on the load power requirement by controlling the switching transistors in the switch array module to be on or off, the battery units in the parallel battery pack to change to a series connection or a series-parallel connection; and the discharging monitoring circuit is configured to monitor discharging status parameters of the battery units, and implement discharging protection on the battery units based on the discharging status parameters by controlling the bypass switches in the switch array module to be on or off.

In one embodiment, the DC/DC conversion module is connected to the discharging control module, and is configured to convert, to a high-voltage direct current signal, a low-voltage direct current signal that is output by the parallel battery pack module, and supply power to a load by using the high-voltage direct current signal.

A third aspect of the embodiments of the present invention provides a fast charging apparatus for a parallel battery pack, including:

a charging current obtaining unit, configured to obtain a maximum charging current allowed by a charging trunk and a charging current required for charging a parallel battery pack;

a charging current comparison unit, configured to compare the charging current required for charging the parallel battery pack with the maximum charging current allowed by the charging trunk; and a connection relationship changing unit, configured to: when the charging current required for charging the parallel battery pack is greater than the maximum charging current allowed by the charging trunk, change some or all of battery units in the parallel battery pack to a series connection, and perform series charging on the battery units.

In one embodiment, the fast charging apparatus further includes:

a charge parameter obtaining unit, configured to obtain charge parameters of the battery units in the parallel battery pack;

a differentiated battery determining unit, configured to determine, based on the charge parameters, whether there is a differentiated battery unit in the parallel battery pack; and the connection relationship changing unit is further configured to: when there is a differentiated battery unit in the parallel battery pack, change some of the battery units in the parallel battery pack to a series connection.

In one embodiment, the differentiated battery determining unit includes:

a characteristic curve obtaining subunit, configured to obtain a charge parameter characteristic curve of each battery unit in the parallel battery pack, where the charge parameter characteristic curve is used to define a characteristic how a charge parameter of the battery unit changes with a charge cycle quantity of the battery unit;

a charge cycle quantity obtaining subunit, configured to obtain a charge cycle quantity of each battery unit in the parallel battery pack, and determine, based on the charge parameter characteristic curve, a charge parameter characteristic value of each battery unit at a corresponding charge cycle quantity; and a charge parameter comparison subunit, configured to compare the charge parameter of each battery unit with the charge parameter characteristic value of the corresponding battery unit, and if there is a battery unit whose charge parameter is less than a charge parameter characteristic value by more than a preset threshold, determine that there is a differentiated battery unit in the parallel battery pack.

In one embodiment, the connection relationship changing unit is specifically configured to:

change the battery units in the parallel battery pack to a series-parallel connection.

In one embodiment, the charging current comparison unit is further configured to:

calculate, based on the maximum charging current allowed by the charging trunk and a maximum charging current allowed by each of the battery units, a maximum quantity of battery units allowed to be connected in parallel; and change the battery units in the parallel battery pack to a series-parallel connection based on the maximum quantity of battery units allowed to be connected in parallel.

In one embodiment, the fast charging apparatus further includes:

a charging status monitoring unit, configured to monitor charging statuses of the battery units; and a bypass protection control unit, configured to: when the charging status monitoring unit detects that charging of the differentiated battery unit is completed, make a charging loop bypass the differentiated battery unit by using a bypass switching transistor, in a switch array module, connected to the differentiated battery unit; and the charging current comparison unit is further configured to re-determine a maximum charging current based on a quantity of the remaining battery units, and perform charging on the remaining battery units by using the re-determined maximum charging current.

In one embodiment, the connection relationship changing unit is specifically configured to:

change the battery units in the parallel battery pack to an all-series connection by controlling switching transistors in a switch array module to be on or off, and perform all-series charging on the battery units; or change the battery units in the parallel battery pack to a series-parallel connection by controlling switching transistors in a switch array module to be on or off, and perform series-parallel charging on the battery units.

In one embodiment, the charging status monitoring unit is further configured to:

monitor charging statuses of the battery units;

if detecting that charging of the battery units is completed, end charging of the battery units; and the connection relationship changing unit is further configured to change the battery units back to a parallel connection; or change the battery units to a series connection or a series-parallel connection based on a load power requirement.

In a scenario in which the charging current required for charging the parallel battery pack is limited by the maximum charging current allowed by the charging trunk, the fast charging apparatus for a parallel battery pack changes the parallel battery pack from parallel charging to series charging, so as to reduce the charging current required for charging the battery pack. This ensures that all battery units can obtain a maximum charging current rate during the charging, and avoids a problem of an excessively high charging current required for charging the parallel battery pack and an insufficient charging current input by an external power source, thereby shortening a charging time of the entire battery pack.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes the embodiments of the present invention with reference to the accompanying drawings.

For a device powered by a rechargeable battery, for example, an electric car, to obtain a relatively high current output and a relatively high charging speed, a battery pack is usually formed by connecting a plurality of battery units in parallel. When a parallel battery pack is charged, a maximum charging current required by the entire battery pack is a sum of maximum charging currents of all battery units connected in parallel. If a maximum charging current that a charging trunk can provide is less than the maximum charging current required by the parallel battery pack, a charging current allocated to each battery unit cannot achieve a maximum charging rate of the battery unit, and consequently, a charging speed of the entire battery pack is limited. In the embodiments of the present invention, to resolve the problem of a long charging time for the parallel battery pack, the maximum charging current allowed by the charging trunk is compared with a charging current required for charging the parallel battery pack, and when the charging current required for charging the parallel battery pack is greater than the maximum charging current allowed by the charging trunk, the battery units in the parallel battery pack are changed to a series connection or a series-parallel connection, so as to reduce impact of a limited maximum charging current allowed by the charging trunk on the charging speed of the entire parallel battery pack, thereby shortening the charging time of the entire parallel battery pack.

Figure 1:
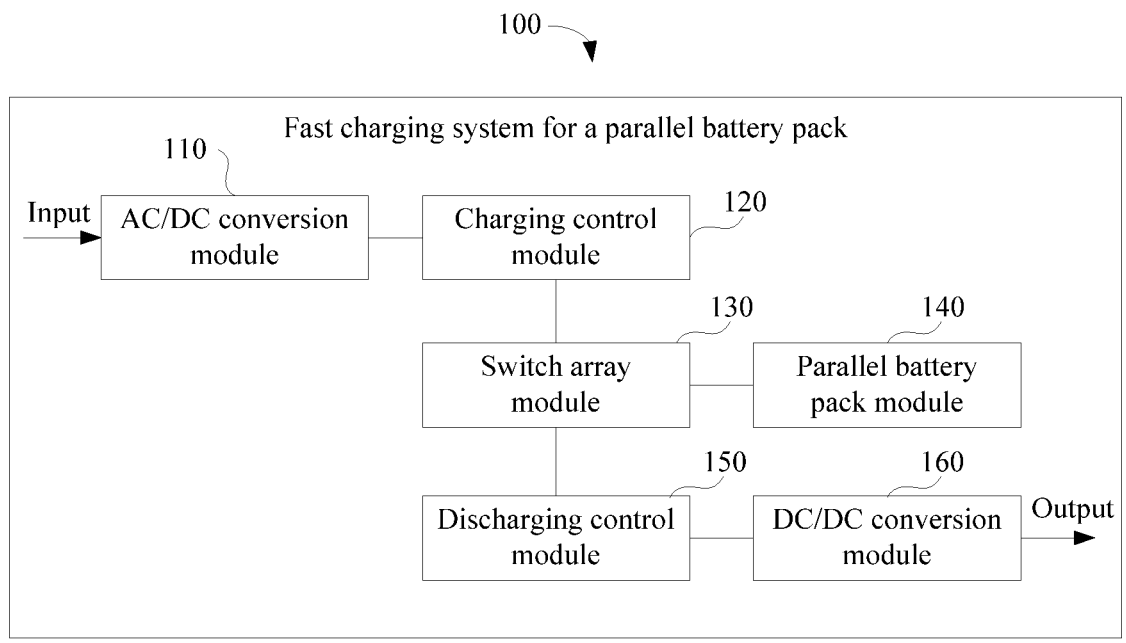
FIG. 1 is a first schematic structural diagram of a fast charging system for a parallel battery pack according to an embodiment of the present invention.

Referring to FIG. 1, in an embodiment of the present invention, a fast charging system 100 for a parallel battery pack is provided, including an AC/DC conversion module 110, a charging control module 120, a switch array module 130, a parallel battery pack module 140, a discharging control module 150, and a DC/DC conversion module 160.

The AC/DC conversion module 110 is connected to the charging control module 120, and is configured to convert, to a direct current signal, an alternating current signal provided by an external power supply (not shown in the figure), and provide a charging current and voltage to the parallel battery pack module 140 by using the direct current signal.

The charging control module 120 is connected to the parallel battery pack module 140 by using the switch array module 130, the parallel battery pack module 140 includes a plurality of battery units 141 connected in parallel (referring to FIG. 2), and the charging control module 120 is configured to: obtain a maximum charging current allowed by a charging trunk and a charging current required for charging the parallel battery pack; and when the charging current required for charging the parallel battery pack is greater than the maximum charging current allowed by the charging trunk, control the switch array module 130 to change some or all of battery units in the parallel battery pack module 140 to a series connection, and perform series charging on the battery units by using the direct current signal that is output by the AC/DC conversion module 110.

The discharging control module 150 is connected to the parallel battery pack module 140 by using the switch array module 130, and is configured to obtain a load power requirement of a load (not shown in the figure), and adjust a discharging power of the parallel battery pack module 140 based on the load power requirement by controlling the switch array module 130.

The DC/DC conversion module 160 is connected to the discharging control module 150, and is configured to convert, to a high-voltage direct current signal, a low-voltage direct current signal that is output by the parallel battery pack module 140, and supply power to the load by using the high-voltage direct current signal.

Figure 2:
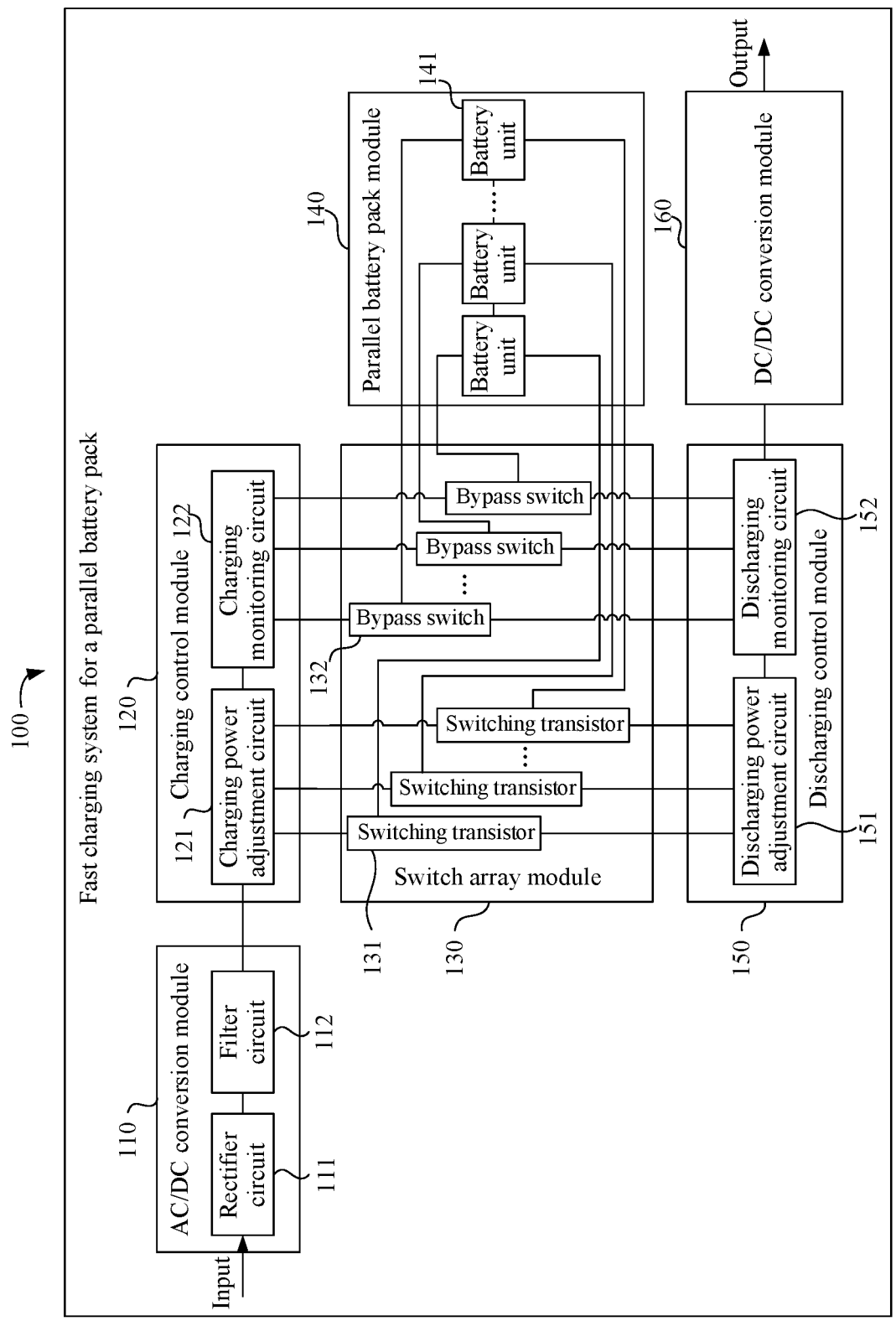
FIG. 2 is a second schematic structural diagram of a fast charging system for a parallel battery pack according to an embodiment of the present invention.

Referring to FIG. 2, in an implementation, the AC/DC conversion module 110 includes a rectifier circuit 111 and a filter circuit 112. The rectifier circuit 111 is connected to the filter circuit 112. The rectifier circuit 111 is configured to convert, to the direct current signal, the alternating current signal provided by the external power supply. The filter circuit 112 is configured to perform filtering processing on the direct current signal that is output by the rectifier circuit 111. The filter circuit 112 is further connected to the charging control module 120, and is configured to send the filtering-processed direct current signal to the charging control module 120.

The charging control module 120 includes a charging power adjustment circuit 121 and a charging monitoring circuit 122. The charging power adjustment circuit 121 is connected to the filter circuit 112 and the parallel battery pack module 140, and is configured to obtain a charging power requirement of the battery units in the parallel battery pack module 140, and adjust a charging power based on the charging power requirement. The charging monitoring circuit 122 is connected to the parallel battery pack module 140 by using the switch array module 130, and is configured to monitor charging status parameters of the battery units in the parallel battery pack module 140, and implement charging protection on the battery units based on the charging status parameters by controlling the switch array module 130. The charging status parameter may be specifically a voltage, a current, a temperature, an internal resistance, or the like.

The switch array module 130 includes a plurality of switching transistors 131 and a plurality of bypass switches 132. Each of the switching transistors 131 is connected to at least one of the battery units 141. Each of the bypass switches 132 is connected to at least one of the battery units 141. The switch array module 130 is configured to: control, by changing an on or off state of the plurality of switching transistors 131, the battery units 141 to change between a series connection, a parallel connection, and a series-parallel connection; and implement charging protection or discharging protection on the battery units 141 based on the charging status parameters of the battery units 141 in the parallel battery pack module 140 that are monitored by the charging monitoring circuit 122, by changing an on or off state of the plurality of bypass switches 132. The switching transistors 131 and the bypass switches 132 may be MOSFETs, relays, electronic switches, or the like.

The battery unit 141 in the parallel battery pack module 140 may be a combination of a plurality of cells, for example, a combination of a plurality of cells connected in a parallel, series, or series-parallel manner, or may be a cell. All the battery units 141 are connected to the switch array module 130. The parallel battery pack module 140 may change a connection relationship between the battery units, based on the switching transistors in the switch array module 130 to be on or off, for example, changing between a series connection, a parallel connection, and a series-parallel connection. In addition, the parallel battery pack module 140 may connect a corresponding battery unit to a charging or discharging loop or make a charging or discharging loop bypass a corresponding battery unit, based on the bypass switches in the switch array module 130 to be on or off, so as to implement charging and discharging protection on the battery units.

The discharging control module 150 includes a discharging power adjustment circuit 151 and a discharging monitoring circuit 152. The discharging power adjustment circuit 151 is connected to the parallel battery pack module 140 by using the switch array module 130 and is connected to the load (not shown in the figure) by using the DC/DC conversion module 160, and is configured to obtain the load power requirement, and control, based on the load power requirement by controlling the switching transistors in the switch array module 130 to be on or off, the battery units in the parallel battery pack module 140 to change to a series connection or a series-parallel connection. The discharging monitoring circuit 152 is connected to the parallel battery pack module 140 by using the switch array module 130, and is configured to monitor discharging status parameters of the battery units in the parallel battery pack module 140, and implement discharging protection on the battery units based on the discharging status parameters by controlling the bypass switches in the switch array module 130 to be on or off. The discharging status parameter may be a voltage, a current, a temperature, an internal resistance, or the like.

In the fast charging system 100 for a parallel battery pack, the switch array module 130 is deployed between the charging control module 120 and the parallel battery pack module 140, and the battery units in the parallel battery pack module 140 may be changed between a series connection, a parallel connection, and a series-parallel connection by controlling the switching transistors in the switch array module 130 to be on or off, so that when the parallel battery pack module 140 is charged, a series/parallel relationship between the battery units can be flexibly adjusted based on the maximum charging current allowed by the charging trunk and the charging current required for charging the parallel battery pack. This can reduce impact of a limited maximum charging current allowed by the charging trunk on a charging speed of the entire parallel battery pack, thereby shortening a charging time of the entire parallel battery pack, and improving charging efficiency.

In an embodiment, the charging control module 120 is further configured to: obtain charge parameters of the battery units 141 in the parallel battery pack 140, and determine, based on the charge parameters, whether there is a differentiated battery unit in the parallel battery pack 140; and when there is a differentiated battery unit in the parallel battery pack 140, control the switch array module 130 to change the battery units in the parallel battery pack module 140 to a series-parallel connection, and perform series-parallel charging on the battery units 141 by using the direct current signal that is output by the AC/DC conversion module 110.

It can be understood that when there is a differentiated battery unit in the parallel battery pack module 140, the battery units in the parallel battery pack module 140 are changed to a series-parallel connection. This can obtain a higher charging current than a charging manner based on an all-series connection, thereby improving a charging speed of the entire parallel battery pack.

It can be understood that in this embodiment, connections between the modules and between circuits included in the modules may be direct connections, or may be indirect electrical connections through some interfaces, apparatuses, modules, components, or circuits.

Figure 3:
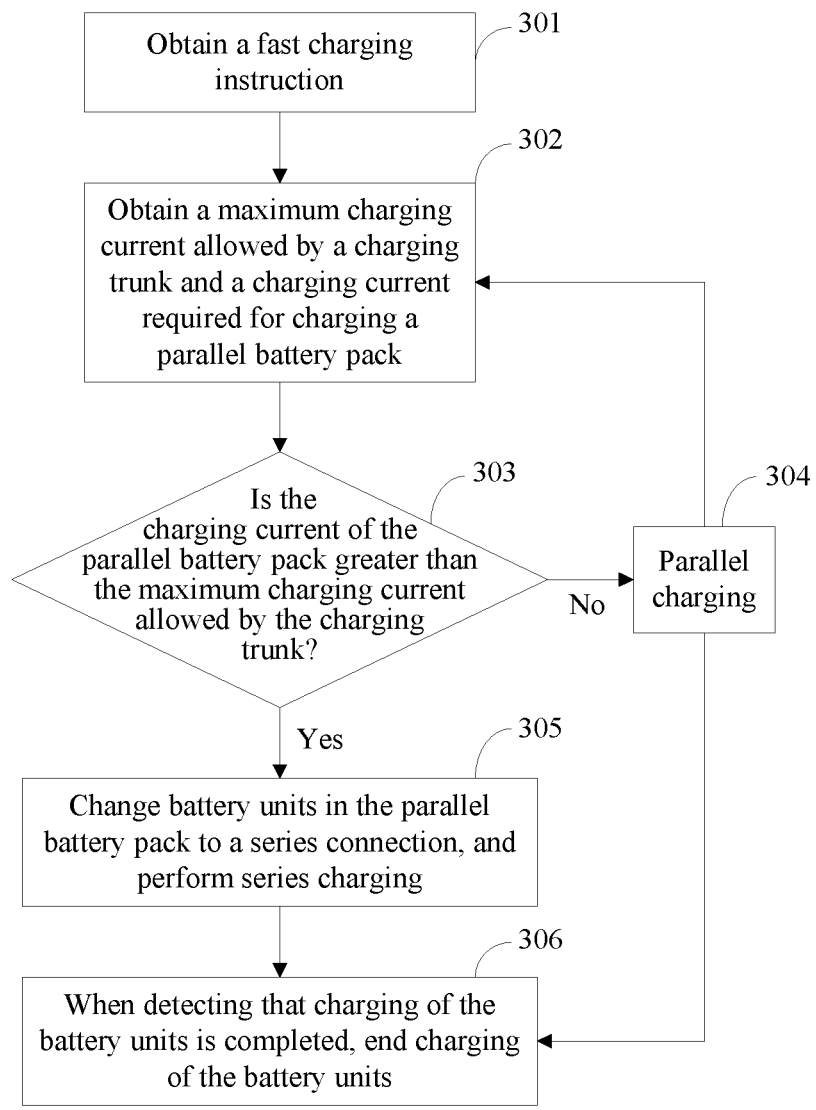
FIG. 3 is a first schematic flowchart of a fast charging method for a parallel battery pack according to an embodiment of the present invention.

Referring to FIG. 3, in an embodiment of the present invention, a fast charging method for a parallel battery pack is provided. The method may be applied to the fast charging system shown in FIG. 1 or FIG. 2. The method includes at least the following operations.

Operation 301: Obtain a fast charging instruction.

Operation 302: Obtain a maximum charging current allowed by a charging trunk and a charging current required for charging a parallel battery pack.

Operation 303: Compare the charging current required for charging the parallel battery pack with the maximum charging current allowed by the charging trunk.

Operation 304: If the charging current required for charging the parallel battery pack is less than or equal to the maximum charging current allowed by the charging trunk, perform parallel charging on the battery units.

Operation 305: If the charging current required for charging the parallel battery pack is greater than the maximum charging current allowed by the charging trunk, change some or all of battery units in the parallel battery pack to a series connection, and perform series charging on the battery units.

Operation 306: Monitor charging statuses of the battery units, and when detecting that charging of the battery units is completed, end charging of the battery units.

The fast charging instruction may be obtained by receiving a selection instruction of a user. For example, the user may select a fast charging mode or enter a charging time by using an interactive interface, or may select a fast charging switch. Alternatively, the fast charging instruction may be a fast charging instruction automatically generated by a to-be-charged device. No limitation is imposed herein.

The charging current required for charging the parallel battery pack is calculated based on a quantity of battery units connected in parallel in the parallel battery pack, and may be specifically a product of a maximum charging current allowed by an individual battery unit and the quantity of batteries connected in parallel. The maximum charging current allowed by the charging trunk is specifically determined by factors such as an input current of an external power source, a quantity of internal charging ports, and a limited current of an internal charging circuit. A smallest current value resulting from limitations of all the factors is the maximum charging current allowed by the charging trunk. The input current of the external power source may be a supply current of an external grid, or may be a supply current of an external power supply. The quantity of internal charging ports specifically means whether multi-mode charging including one charging port and a plurality of charging ports is supported. A larger quantity of charging ports indicates a higher charging current obtainable and a shorter charging time. Generally, electric cars support a standard charging mode with one charging port (single-phase AC220V16A or three-phase AC380V32A), a fast charging mode with two charging ports (single-phase AC220V32A or three-phase AC380V63A), and a high-voltage superfast charging mode (DC3600V300A). For electric car charging scenarios, input charging currents that can be obtained in different charging places are different. For details, refer to Table 1.

TABLE 1

Maximum charging currents corresponding to different charging modes and different scenarios

| Charging mode | Place of use | Maximum charging voltage | Maximum charging current | Remarks |
| --- | --- | --- | --- | --- |
| Single-port charging: standard | Home | 220 V AC | 16 A | Connect to an alternating current grid by using a standard socket. |
| Dual-port charging: fast charging | Shopping mall and parking lot | 220 V AC | 32 A | Connect to an alternating current grid by using a specific power supply device. |
| Single-port charging: standard | | 380 V AC | 32 A | |
| Dual-port charging: fast charging | | 380 V AC | 63 A | |
| High-voltage superfast charging | Highway server and charging station | 3600 V DC | 300 A | Connect to an alternating current grid by using a non-in-vehicle charger. |

Impact of the internal charging circuit on the maximum charging current allowed by the charging trunk may be specifically impact of factors such as a limited current, and a material, and a cross-sectional area of a cable wire of the charging circuit. Details are not described herein. A maximum charging current of each of the battery units is determined by inherent factors such as a selected material and a battery structure of the battery unit, and is usually expressed by a multiple of a rated capacity C of the battery unit. Using a lithium-ion battery as an example, a maximum charging current of a capacity battery may be 0 to 3 C, and a maximum charging current of a rate battery may be 0 to 10 C. For other batteries, no limitation is imposed herein.

In an embodiment, the changing some or all of battery units in the parallel battery pack to a series connection, and performing series charging on the battery units includes:

changing the battery units in the parallel battery pack to an all-series connection by controlling switching transistors in a switch array module to be on or off, and performing all-series charging on the battery units; or changing the battery units in the parallel battery pack to a series-parallel connection by controlling switching transistors in a switch array module to be on or off, and performing series-parallel charging on the battery units.

When all-series charging is performed, a minimum charging current can be reached, and requirements for an external input charging current and an internal charging circuit current are minimum. However, all-series charging has a relatively high requirement for consistency between battery units. When there is a differentiated battery unit among battery units connected in series, an all-series charging speed is affected. When series-parallel charging is performed, because of existence of a parallel connection, a charging current of the charging trunk may increase accordingly with a decrease of battery units connected in series or an increase of battery units connected in parallel. This imposes a lower requirement for consistency between battery units or batteries connected in series in comparison with all-series charging.

In an embodiment, after the ending charging of the battery units, the method further includes:

changing the battery units back to a parallel connection; or changing the battery units to a series connection or a series-parallel connection based on a load power requirement.

A discharging scenario of the parallel battery pack is not limited in this embodiment of the present invention.

For a scenario in which a charging current of the charging trunk is limited when the parallel battery pack is charged, the parallel battery pack is changed from parallel charging to series charging, so as to match an actual input charging current of the charging trunk. This ensures that all battery units can obtain a maximum charging current during the charging, and avoids a problem of an excessively high charging current required for charging the parallel battery pack, an insufficient charging current input by the external power source, and an overcurrent internal charging port and charging circuit, thereby shortening a charging time of the entire battery pack.

Figure 4A:
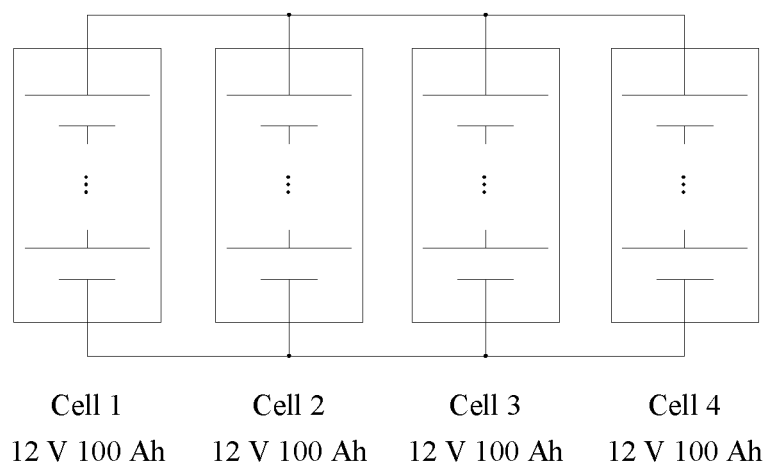
FIG. 4A to FIG. 4C are schematic diagrams of application scenarios of a fast charging method for a parallel battery pack according to an embodiment of the present invention.

Referring to FIG. 4A, in an embodiment, it is assumed that the parallel battery pack includes four battery units, denoted by a cell 1, a cell 2, a cell 3, and a cell 4, respectively, and a rated capacity C of each of the four battery units is 12 V 100 Ah. In addition, it is assumed that a maximum charging current 4 C of each of the battery units is 400 A [12 V 400 A], and a maximum charging current allowed by the charging trunk is 800 A.

1. Referring to FIG. 4A, when 4P (four battery units connected in parallel) all-parallel charging is performed, a maximum charging current of the charging trunk is 4×4 C=1600 A. Because of a limitation of a maximum external input charging current supported by a charging port in the charging trunk, which is 800 A, an actual charging current for the battery units when an 800 A current is directly used for all-parallel charging is only 2 C=200 A [12 V 200 A], and a time for full-charging the entire battery pack is:

$$T1=1 \ C/2 \ C=½ \ h$$

In this process, a current passing each battery unit is far below the maximum charging current 4 C that the battery unit can withstand, and consequently, an actual charging time of fast charging is longer.

Figure 4B:
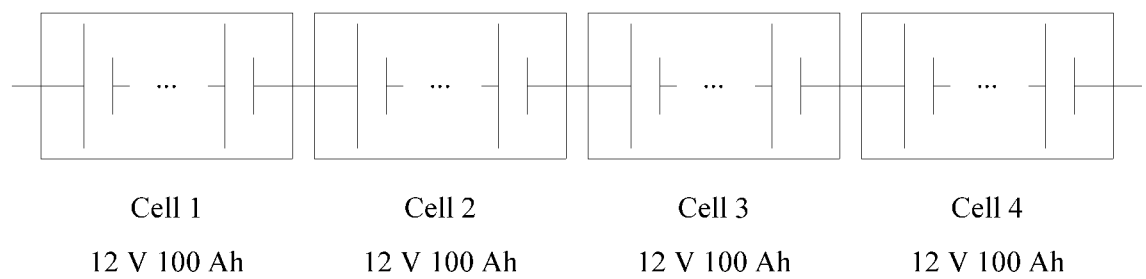

2. Referring to FIG. 4B, if 4P all-parallel charging is changed to 4S all-series charging during charging, an input charging current of the charging trunk may decrease to 400 A, and an actual charging current passing each battery unit reaches the maximum charging current of the battery unit which is 4 C=400 A [48 V 400 A]; and a time for full-charging the entire battery pack is:

$$T2=1 \ C/4 \ C=¼ \ h$$

When 4S all-series charging is performed, the charging time is ¼ h, 50%, shorter than that in 4P all-parallel charging. A charging time gain is high and a charging speed can be effectively improved.

Figure 4C:
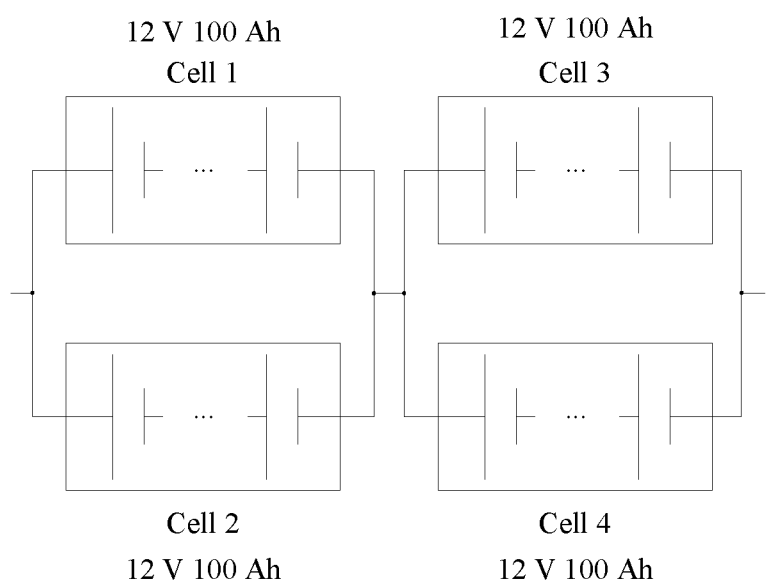

3. Referring to FIG. 4C, 4P all-parallel charging may be changed to 2S2P series-parallel charging in addition to the 4S all-series charging manner. When battery units in a series battery pack are all consistent (that is, states of charge of the battery units are all the same), a charging current required for 2S2P series-parallel charging is 800 A, equal to the maximum charging current allowed by the charging trunk. In addition, a current passing battery units connected in series can reach the maximum charging current of the battery unit which is 4 C=400 A [24 V 800 A], and a time for full-charging the entire battery pack is:

$$T3=1 \ C/4 \ C=¼ \ h$$

When 2S2P series-parallel charging is performed, the charging time is the same as that in all-series charging, and is ¼ h, 50%, shorter than that in 4P parallel charging. A higher charging time gain can also be obtained, and a charging speed can be effectively improved.

It can be learned by comparing the embodiments shown in FIG. 4A to FIG. 4C that, when the charging current required for charging the parallel battery pack is greater than the maximum charging current allowed by the charging trunk, changing the battery units in the parallel battery pack to a series connection or a series-parallel connection can effectively shorten a charging time of the entire parallel battery pack and improve charging efficiency.

Figure 5:
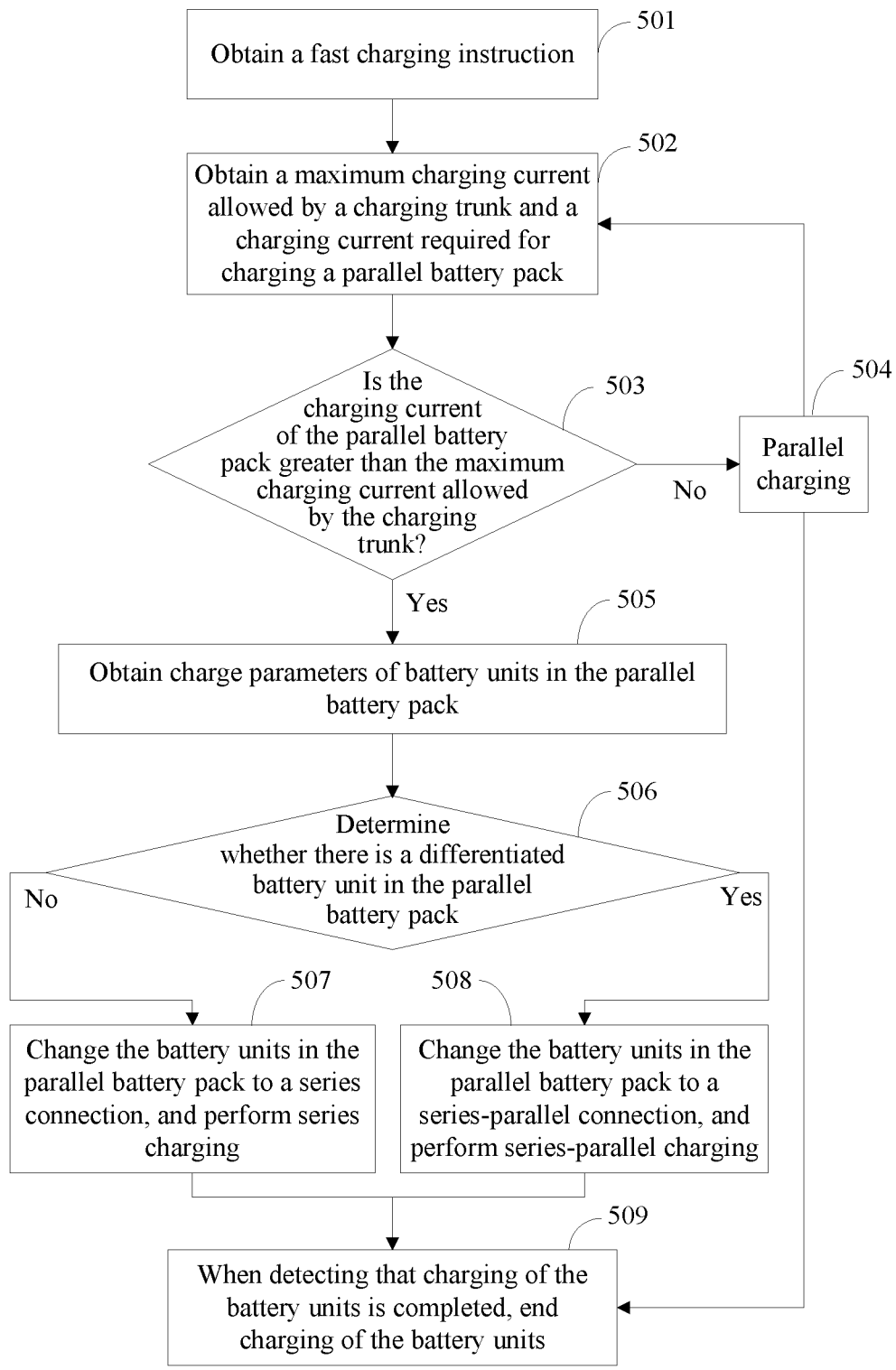
FIG. 5 is a second schematic flowchart of a fast charging method for a parallel battery pack according to an embodiment of the present invention.

Referring to FIG. 5, in an embodiment, a fast charging method for a parallel battery pack is provided. The method includes at least the following operations.

Operation 501: Obtain a fast charging instruction.

Operation 502: Obtain a maximum charging current allowed by a charging trunk and a charging current required for charging a parallel battery pack.

Operation 503: Compare the charging current required for charging the parallel battery pack with the maximum charging current allowed by the charging trunk.

Operation 504: If the charging current required for charging the parallel battery pack is less than or equal to the maximum charging current allowed by the charging trunk, perform parallel charging on the battery units.

Operation 505: If the charging current required for charging the parallel battery pack is greater than the maximum charging current allowed by the charging trunk, obtain charge parameters of battery units in the parallel battery pack.

Operation 506: Determine, based on the charge parameters, whether there is a differentiated battery unit in the parallel battery pack, where the differentiated battery unit is a battery unit whose charge parameter is different from a charge parameter of the rest battery units in the parallel battery pack.

Operation 507: If there is no differentiated battery unit in the parallel battery pack, change the battery units in the parallel battery pack to a series connection, and perform series charging on the battery units.

Operation 508: If there is a differentiated battery unit in the parallel battery pack, change the battery units in the parallel battery pack to a series-parallel connection, and perform series-parallel charging on the battery units.

Operation 509: Monitor charging statuses of the battery units, and when detecting that charging of the battery units is completed, end charging of the battery units.

Operations 501 to 504 are the same as operations 301 to 304 in the embodiment shown in FIG. 3. For details, reference may be made to related descriptions in the embodiment shown in FIG. 3, and repetitive descriptions are omitted herein.

When a plurality of battery units are used after being connected in a series-parallel combined manner, because of automatic equalization between the battery units, voltages of the battery units are kept essentially the same, and a specific difference lies in capacities of the battery units. In this embodiment, the differentiated battery unit may be determined by using a charge parameter of the battery unit. The charge parameter may be specifically a state of charge (SOC) of the battery unit. It can be understood that the differentiated battery unit may be a result of an initial consistency problem between the battery units, or may be a result of failure of a cell in the battery unit.

Figure 6:
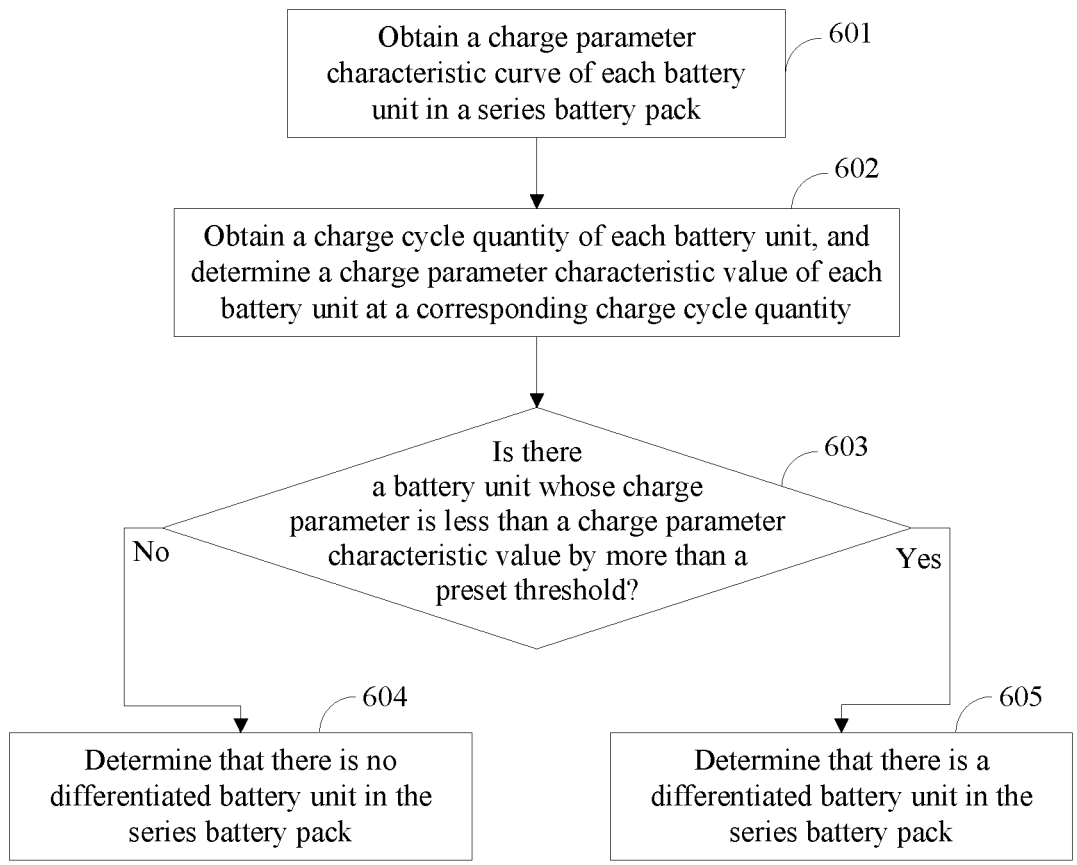
FIG. 6 is a third schematic flowchart of a fast charging method for a parallel battery pack according to an embodiment of the present invention.

Referring to FIG. 6, in an embodiment, the determining, based on the charge parameters, whether there is a differentiated battery unit in the parallel battery pack includes:

Operation 601: Obtain a charge parameter characteristic curve of each battery unit in the parallel battery pack, where the charge parameter characteristic curve is used to define a characteristic how a charge parameter of the battery unit changes with a charge cycle quantity of the battery unit.

Operation 602: Obtain a charge cycle quantity of each battery unit in the parallel battery pack, and determine, based on the charge parameter characteristic curve, a charge parameter characteristic value of each battery unit at a corresponding charge cycle quantity.

Operation 603: Compare the charge parameter of each battery unit with the charge parameter characteristic value of the corresponding battery unit.

Operation 604: If there is no battery unit whose charge parameter is less than a charge parameter characteristic value by more than a preset threshold, determine that there is no differentiated battery unit in the parallel battery pack.

Operation 605: If there is a battery unit whose charge parameter is less than a charge parameter characteristic value by more than a preset threshold, determine that there is a differentiated battery unit in the parallel battery pack.

It can be understood that, as the charge cycle quantity of the battery unit increases, the charge parameter characteristic value (which is a capacity of a battery when the battery is fully charged in this embodiment) of the battery unit changes according to a specific rule, and usually decreases regularly as the charge cycle quantity increases, thereby forming the charge parameter characteristic curve of the battery unit. It can be understood that the charge parameter characteristic curve of the battery unit is determined by factors such as a selected material and a battery structure of the battery unit, and generally, batteries of a same model have a same charge parameter characteristic curve. Therefore, in this embodiment, the charge parameter characteristic curve and the charge cycle quantity of each battery unit in the parallel battery pack may be obtained, the charge parameter characteristic value of each battery unit at the corresponding charge cycle quantity is determined based on the charge parameter characteristic curve, and the charge parameter of each battery unit is compared with the charge parameter characteristic value at the corresponding charge cycle quantity, so as to determine whether the corresponding battery unit is a differentiated battery unit.

Specifically, the preset threshold may be specified. When a charge parameter of the battery unit is less than a charge parameter characteristic value corresponding to a charge cycle quantity of the battery unit by more than the preset threshold, the battery unit is determined as a differentiated battery unit. For example, it is assumed that a rated capacity of each battery unit in the parallel battery pack is 100 Ah, and according to a charge parameter characteristic curve of each battery unit, the capacity of each battery unit decreases to 80 Ah after N charge cycles. That is, a charge parameter characteristic value corresponding to N charge cycles is 80 Ah. It is also assumed that the preset threshold is 10%. If it is obtained after N charge cycles that there is a battery unit whose charge parameter is 50 Ah in the parallel battery pack, because the charge parameter is less than the normal charge parameter characteristic value 80 Ah by more than 10%, the battery unit can be determined as a differentiated battery unit.

When there is a differentiated battery unit in the parallel battery pack, if an all-series charging manner is used, a charging current is limited by the differentiated battery unit, and consequently, a charging current of normal battery units in the battery pack cannot achieve a maximum rate, and a charging time of the entire battery pack increases. Therefore, in this embodiment, when the charging current required for charging the parallel battery pack is greater than the maximum charging current allowed by the charging trunk, and there is a differentiated battery unit in the parallel battery pack, the battery units in the parallel battery pack are changed to a series-parallel connection, so as to reduce the charging current required for charging the battery pack, thereby reducing impact of a limitation of the differentiated battery unit on the charging current, and improving a charging speed of the entire battery pack.

In an embodiment, the changing the battery units in the parallel battery pack to a series-parallel connection includes:

calculating, based on the maximum charging current allowed by the charging trunk and a maximum charging current of each of the battery units, a maximum quantity of battery units allowed to be connected in parallel; and changing the battery units in the parallel battery pack to a series-parallel connection based on the maximum quantity of battery units allowed to be connected in parallel.

In one embodiment, the maximum charging current allowed by the charging trunk is denoted by Iinput, and the maximum charging current of each of the battery units is denoted by Icell. If the parallel battery pack includes N battery units, when Iinput<N×Icell, a charging current of all-parallel charging may exceed the maximum charging current allowed by the charging trunk; in this case, the N batteries need to be first connected in a series-parallel manner, to reduce a charging current; and when Iinput≥N×Icell, a current of all-parallel charging is not greater than the maximum charging current allowed by the charging trunk, and all-parallel charging can be performed.

That the N batteries are first connected in a series-parallel manner needs to be implemented by calculating, based on the maximum charging current Iinput allowed by the charging trunk and the maximum charging current Icell of each of the battery units, a maximum quantity of battery units that can be connected in parallel. Specifically, the maximum quantity of battery units that can be connected in parallel is M=Iinput/Icell, and series battery units in the parallel battery pack are changed to the series-parallel connection. For example, it is assumed that Iinput is 800 A, that Icell is 400 A, and that the parallel battery pack includes four battery units. Therefore, the maximum quantity of battery units that can be connected in parallel is M=800/400=2. This means that the four battery units need to undergo a two-two parallel connection before a series connection, to form a 2S2P series-parallel connection.

In an embodiment, after the performing series-parallel charging on the battery units, the method further includes:

monitoring charging statuses of the battery units;

if detecting that charging of the differentiated battery unit is completed, making a charging loop bypass the differentiated battery unit by using a bypass switching transistor, in a switch array module, connected to the differentiated battery unit; and re-determining a maximum charging current based on a quantity of the remaining battery units, and performing charging on the remaining battery units by using the re-determined maximum charging current.

Figure 7A:
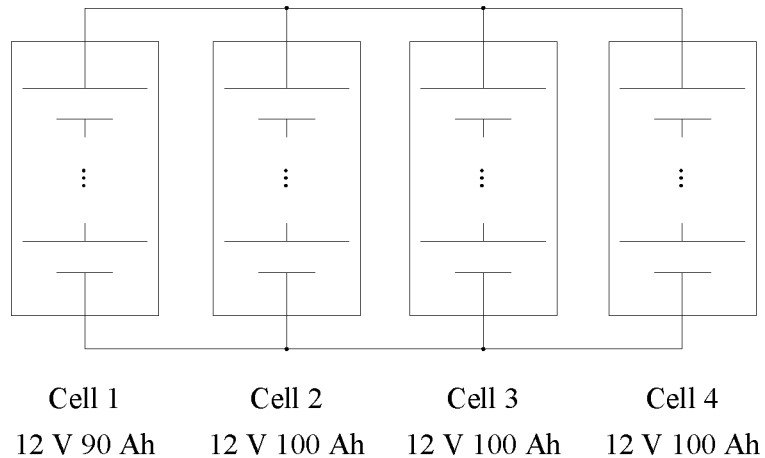
FIG. 7A to FIG. 7C are schematic diagrams of application scenarios of a fast charging method for a parallel battery pack according to an embodiment of the present invention.

Referring to FIG. 7A, in an embodiment, it is assumed that the parallel battery pack includes four battery units, denoted by a cell 1, a cell 2, a cell 3, and a cell 4, respectively, and in normal cases, a rated capacity C of each of the four battery units is 12 V 100 Ah, and a maximum charging current of each of the battery units is 4 C=400 A [12 V 400 A]. In addition, it is assumed that the capacity of the battery unit cell 1 decreases to 12 V 90 Ah due to a failure of some cells, and a maximum charging current allowed by the charging trunk is 800 A.

1. Referring to FIG. 7A, when 4P (four battery units connected in parallel) all-parallel charging is performed, a maximum charging current of the charging trunk is 4 C=4× (90+100+100+100)=1560 A. Because of a limitation of a maximum external input charging current supported by a charging port in the charging trunk, which is 800 A, an actual charging current for the battery units when an 800 A current is directly used for all-parallel charging is only (800/390) C, and a time for full-charging the entire battery pack is:

$$T1=1 \ C/(80/39) \ C=\tfrac{39}{80} \ h$$

In this process, a current passing each battery unit is far below the maximum charging current 4 C that the battery unit can withstand, and consequently, an actual charging time of fast charging is longer.

Figure 7B:
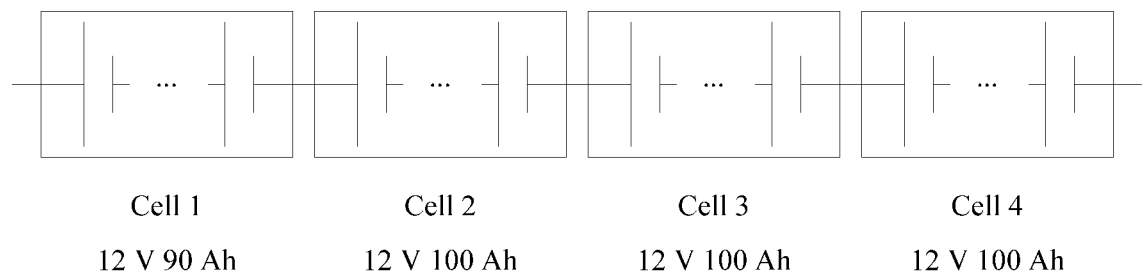

2. Referring to FIG. 7B, when 4S (four battery units connected in series) all-series charging is performed, a charging current of the charging trunk is limited by the differentiated battery cell 1 to be only a maximum charging current of the cell 1, which is 4 C=360 A [48 V 360 A], and a time for full-charging the cell 1 is:

$$T1=1 \ C/4 \ C=\tfrac{1}{4} \ h$$

In this process, for the cell 2 to the cell 4, a charging current is 3.6 C, and a capacity upon completion of the charging is ¼×3.6 C=0.9 C; when charging continues, the cell 1 may be bypassed by using a bypass switch, and charging is performed based on a maximum 3S (three battery units connected in series) charging current which is 4 C=400 A [36 V 400 A], and a time for full-charging the cell 2 to the cell 4 is:

$$T2=(1 \ C-0.9 \ C)/4 \ C=\tfrac{1}{40} \ h$$

When the 4S all-series charging is performed, a total charging time of the entire battery pack is T1+T2=11/40 h.

Figure 7C:
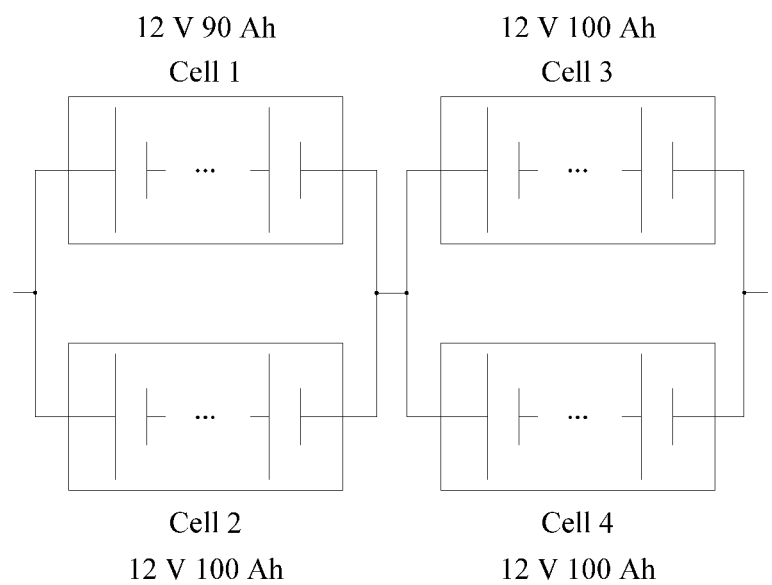

3. Referring to FIG. 7C, if 4P all-parallel charging is changed to 2S2P series-parallel charging during charging, first, based on the differentiated battery unit cell 1, a maximum charging current of the charging trunk may be 4×(90+100)=760 A [24 V 760 A], a capacity of a first parallel is (90 Ah+100 Ah) which is 4 C, and a capacity of a second parallel is (100 Ah+100 Ah) which is 3.8 C, and a time for full-charging the first parallel is:

$$T4=1 \ C/4 \ C=\tfrac{1}{4} \ h$$

In this case, a capacity of the second parallel upon completion of the charging is ¼×3.8 C=3.8/4 C; and when charging continues, the first parallel needs to be bypassed, and charging is performed based on a 2P charging current which is 4 C=800 A [12 V 800 A], and a time for full-charging the second parallel is:

$$T5=(1 \ C-3.8/4 \ C)/4 \ C=\tfrac{1}{80} \ h$$

When 2S2P series-parallel charging is performed, a total charging time of the entire battery pack is T6=T4+T5=21/80 h, and the charging time is 1/80 h, about 4.5%, shorter than that of the 4S all-series charging. In addition, in this case, the charging current in the charging trunk is much lower than the charging current in the case of 4P all-parallel charging, and requirements on an input current of an external power supply device and an internal charging circuit are relaxed.

It can be learned by comparing the embodiments shown in FIG. 7A to FIG. 7C, when there is a differentiated battery unit in the parallel battery pack, if an all-series charging manner is used, a charging current is limited by the differentiated battery unit, and consequently, a charging current of normal battery units in the battery pack cannot achieve a maximum rate, and a charging time of the entire battery pack increases. Therefore, in this embodiment, when the charging current required for charging the parallel battery pack is greater than the maximum charging current allowed by the charging trunk, and there is a differentiated battery unit in the parallel battery pack, the battery units in the parallel battery pack are changed to a series-parallel connection, so as to reduce the charging current required for charging the battery pack, thereby reducing impact of a limitation of the differentiated battery unit on the charging current, and improving a charging speed of the entire battery pack.

Figure 8:
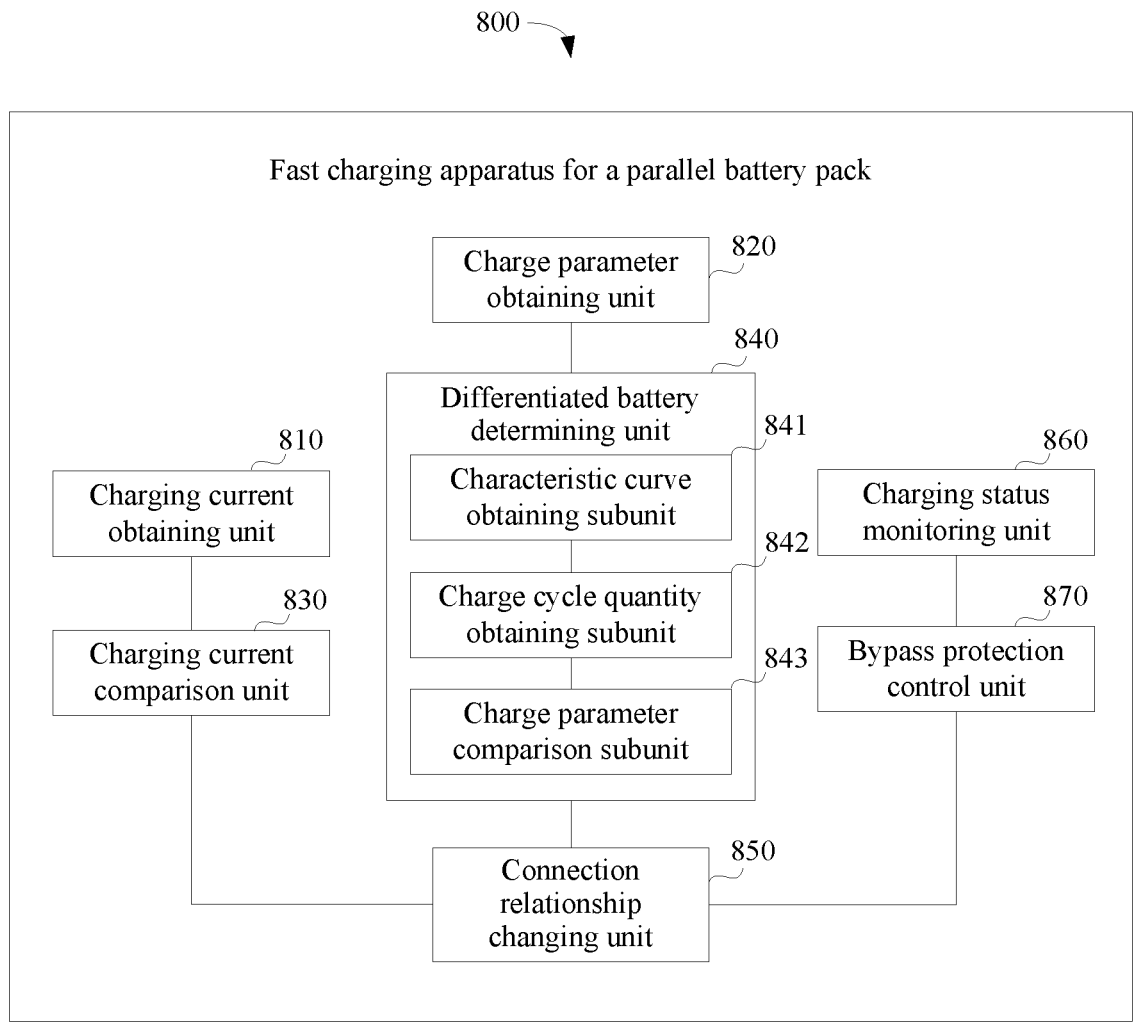
FIG. 8 is a schematic structural diagram of a fast charging apparatus for a parallel battery pack according to an embodiment of the present invention.

Referring to FIG. 8, in an embodiment of the present invention, a fast charging apparatus 800 for a parallel battery pack is provided. The apparatus 800 includes:

a charging current obtaining unit 810, configured to obtain a maximum charging current allowed by a charging trunk and a charging current required for charging a parallel battery pack;

a charging current comparison unit 830, configured to compare the charging current required for charging the parallel battery pack with the maximum charging current allowed by the charging trunk; and a connection relationship changing unit 850, configured to: when the charging current required for charging the parallel battery pack is greater than the maximum charging current allowed by the charging trunk, change some or all of battery units in the parallel battery pack to a series connection, and perform series charging on the battery units.

In an embodiment, the fast charging apparatus 800 further includes:

a charge parameter obtaining unit 820, configured to obtain charge parameters of the battery units in the parallel battery pack;

a differentiated battery determining unit 840, configured to determine, based on the charge parameters, whether there is a differentiated battery unit in the parallel battery pack; and the connection relationship changing unit 850 is further configured to: when there is a differentiated battery unit in the parallel battery pack, change some of the battery units in the parallel battery pack to a series connection.

In an embodiment, the differentiated battery determining unit 840 includes:

a characteristic curve obtaining subunit 841, configured to obtain a charge parameter characteristic curve of each battery unit in the parallel battery pack, where the charge parameter characteristic curve is used to define a characteristic how a charge parameter of the battery unit changes with a charge cycle quantity of the battery unit;

a charge cycle quantity obtaining subunit 842, configured to obtain a charge cycle quantity of each battery unit in the parallel battery pack, and determine, based on the charge parameter characteristic curve, a charge parameter characteristic value of each battery unit at a corresponding charge cycle quantity; and a charge parameter comparison subunit 843, configured to compare the charge parameter of each battery unit with the charge parameter characteristic value of the corresponding battery unit, and if there is a battery unit whose charge parameter is less than a charge parameter characteristic value by more than a preset threshold, determine that there is a differentiated battery unit in the parallel battery pack.

In an embodiment, if there is a differentiated battery unit in the parallel battery pack, the connection relationship changing unit 850 is specifically configured to:

change the battery units in the parallel battery pack to a series-parallel connection, and perform series-parallel charging on the battery units.

In an implementation, the charging current comparison unit 830 is further configured to:

calculate, based on the maximum charging current allowed by the charging trunk and a maximum charging current allowed by each of the battery units, a maximum quantity of battery units allowed to be connected in parallel; and change the battery units in the parallel battery pack to a series-parallel connection based on the maximum quantity of battery units allowed to be connected in parallel.

In an embodiment, the fast charging apparatus 800 further includes:

a charging status monitoring unit 860, configured to monitor charging statuses of the battery units; and a bypass protection control unit 870, configured to: when the charging status monitoring unit 860 detects that charging of the differentiated battery unit is completed, make a charging loop bypass the differentiated battery unit by using a bypass switching transistor, in a switch array module, connected to the differentiated battery unit; and the charging current comparison unit 830 is further configured to re-determine a maximum charging current based on a quantity of the remaining battery units, and perform charging on the remaining battery units by using the re-determined maximum charging current.

In an embodiment, the connection relationship changing unit 850 is specifically configured to:

change the battery units in the parallel battery pack to an all-series connection by controlling switching transistors in a switch array module to be on or off, and perform all-series charging on the battery units; or change the battery units in the parallel battery pack to a series-parallel connection by controlling switching transistors in a switch array module to be on or off, and perform series-parallel charging on the battery units.

In an embodiment, the charging status monitoring unit 860 is further configured to:

monitor charging statuses of the battery units;

if detecting that charging of the battery units is completed, end charging of the battery units; and the connection relationship changing unit 850 is further configured to change the battery units back to a parallel connection; or change the battery units to a series connection or a series-parallel connection based on a load power requirement.

It can be understood that, for functions and specific implementation of the units in the fast charging apparatus 800 for a parallel battery pack in this embodiment, reference may be made to related descriptions in the system embodiment shown in FIG. 1 and FIG. 2 and the method embodiments shown in FIG. 3 to FIG. 7, and details are not repeated herein.

It may be understood that in the several embodiments provided in this application, it should be understood that the disclosed system, method, and apparatus may be implemented in other manners. For example, the described apparatus embodiments are merely examples. The module division is merely logical function division and may be other division in actual implementation. For example, a plurality of units may be combined or integrated into another system, or some features may be ignored or not performed. In an implementation, the apparatus is stored in a memory in a form of an executable program module and is called and executed by a processor, so that the processor controls the modules in the fast charging system to perform corresponding operations, to implement fast charging of the parallel battery pack.

It may be understood that a sequence of the steps of the method in the embodiments of the present invention may be adjusted, and particular steps may be merged or deleted based on an actual requirement. Correspondingly, the units in the apparatus in the embodiments of the present invention may be combined, divided, or deleted based on an actual requirement.

What are disclosed above are merely embodiments of the present invention, and certainly are not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A fast charging method for a parallel battery pack, comprising:

obtaining a maximum charging current allowed by a charging trunk and a charging current required for charging a parallel battery pack;

comparing the charging current required for charging the parallel battery pack with the maximum charging current allowed by the charging trunk;

if the charging current required for charging the parallel battery pack is less than or equal to the maximum charging current allowed by the charging trunk, performing parallel charging on battery units; or if the charging current required for charging the parallel battery pack is greater than the maximum charging current allowed by the charging trunk, changing at least a portion of battery units in the parallel battery pack to a series connection, and performing series charging on the battery units wherein before the changing all of the battery units in the parallel battery pack to a series connection, the method further comprises:

obtaining charge parameters of the battery units in the parallel battery pack based on charge parameter characteristic curves each of which is indicative of how a charge parameter of a respective battery unit changes with a charge cycle quantity of the battery unit;

determining, based on the charge parameters, whether there is a differentiated battery unit in the parallel battery pack; and if there is a differentiated battery unit in the parallel battery pack, changing some of the battery units in the parallel battery pack to a series connection.

2. The method according to claim 1, wherein the determining, based on the charge parameters, whether there is a differentiated battery unit in the parallel battery pack comprises:

obtaining a charge parameter characteristic curve of each battery unit in the parallel battery pack;

obtaining a charge cycle quantity of each battery unit in the parallel battery pack, and determining, based on the charge parameter characteristic curve, a charge parameter characteristic value of each battery unit at a corresponding charge cycle quantity; and comparing the charge parameter of each battery unit with the charge parameter characteristic value of the corresponding battery unit, and if there is a battery unit whose charge parameter is less than a charge parameter characteristic value by more than a preset threshold, determining that there is a differentiated battery unit in the parallel battery pack.

3. The method according to claim 1, wherein the changing some of the battery units in the parallel battery pack to a series connection comprises:
   calculating, based on the maximum charging current allowed by the charging trunk and a maximum charging current allowed by each of the battery units, a maximum quantity of battery units allowed to be connected in parallel; and
   changing the battery units in the parallel battery pack to a series-parallel connection based on the maximum quantity of battery units allowed to be connected in parallel.

4. The method according to claim 3, wherein after the performing series charging on the battery units, the method further comprises:
   monitoring charging statuses of the battery units;
   in response to detecting that charging of the differentiated battery unit is completed, making a charging loop bypass the differentiated battery unit using a bypass switching transistor, in a switch array module, connected to the differentiated battery unit; and
   re-determining a maximum charging current based on a quantity of the remaining battery units, and performing charging on the remaining battery units using the re-determined maximum charging current.

5. The method according to claim 1, wherein the changing at least a portion of battery units in the parallel battery pack to a series connection, and performing series charging on the battery units comprises:
   changing the battery units in the parallel battery pack to an all-series connection by controlling switching transistors in a switch array module to be on or off, and performing all-series charging on the battery units; or
   changing the battery units in the parallel battery pack to a series-parallel connection by controlling switching transistors in a switch array module to be on or off, and performing series-parallel charging on the battery units.

6. The method according to claim 1, wherein after the performing series charging on the battery units, the method further comprises:
   monitoring charging statuses of the battery units;
   in response to detecting that charging of the battery units is completed, ending charging of the battery units; and
   changing the battery units back to a parallel connection; or
   changing the battery units to a series connection or a series-parallel connection based on a load power requirement.

7. A fast charging system for a parallel battery pack, comprising:
   an alternating current to direct current (AC/DC) conversion module,
   a charging control module,
   a switch array module, and
   a parallel battery pack module, wherein
   the AC/DC conversion module is connected to the charging control module, and is configured to convert, to a DC signal, an AC signal provided by an external power supply;
   the charging control module is connected to the parallel battery pack module using the switch array module, the parallel battery pack module comprises a plurality of battery units connected in parallel, and the charging control module is configured to:
   obtain a maximum charging current allowed by a charging trunk and a charging current required for charging the parallel battery pack module; and when the charging current required for charging the parallel battery pack is greater than the maximum charging current allowed by the charging trunk, control the switch array module to change some or all of battery units in the parallel battery pack module to a series connection, and perform series charging on the battery units by using the direct current signal that is output by the AC/DC conversion module;
   obtain charge parameters of the battery units in the parallel battery pack based on charge parameter characteristic curves each of which is indicative of how a charge parameter of a respective battery unit changes with a charge cycle quantity of the battery unit, and determine, based on the charge parameters, whether there is a differentiated battery unit in the parallel battery pack; and
   when there is a differentiated battery unit in the parallel battery pack, control the switch array module to change the battery units in the parallel battery pack module to a series-parallel connection, and perform series-parallel charging on the battery units by using the DC signal that is output by the AC/DC conversion module.

8. The fast charging system according to claim 7, wherein the switch array module comprises a plurality of switching transistors and a plurality of bypass switches, each of the switching transistors is connected to at least one of the battery units, and each of the bypass switches is connected to at least one of the battery units; and the switch array module is configured to:
   control, by changing an on or off state of the plurality of switching transistors, the battery units to change between a series connection, a parallel connection, and a series-parallel connection; and
   implement charging protection or discharging protection on the battery units by changing an on or off state of the plurality of bypass switches.

9. The fast charging system according to claim 8, wherein the charging control module comprises a charging power adjustment circuit and a charging monitoring circuit; the charging power adjustment circuit is configured to obtain a charging power requirement of the battery units that have been changed to the series connection or the series-parallel connection, and adjust a charging power based on the charging power requirement; and the charging monitoring circuit is configured to monitor charging status parameters of the battery units, and implement charging protection on the battery units based on the charging status parameters by controlling the bypass switches in the switch array module to be on or off.

10. The fast charging system according to claim 8, wherein the fast charging system further comprises a discharging control module; and the discharging control module is connected to the parallel battery pack module using the switch array module, and is configured to obtain a load power requirement, and adjust a discharging power of the parallel battery pack module based on the load power requirement by controlling the switch array module.

11. The fast charging system according to claim 10, wherein the discharging control module comprises a discharging power adjustment circuit and a discharging monitoring circuit; the discharging power adjustment circuit is configured to control, based on the load power requirement by controlling the switching transistors in the switch array module to be on or off, the battery units in the parallel battery pack to change to a series connection or a series-parallel connection; and the discharging monitoring circuit is configured to monitor discharging status parameters of the battery units, and implement discharging protection on the battery units based on the discharging status parameters by controlling the bypass switches in the switch array module to be on or off.

12. The fast charging system according to claim 7, wherein the fast charging system further comprises a DC/DC conversion module; and the DC/DC conversion module is connected to the discharging control module, and is configured to convert, to a high-voltage direct current signal, a low-voltage DC signal that is output by the series battery pack module, and supply power to a load by using the high-voltage DC signal.

* * * * *